US012366417B2

(12) United States Patent
Song et al.

(10) Patent No.: US 12,366,417 B2
(45) Date of Patent: Jul. 22, 2025

(54) HEAT EXCHANGE DEVICE (71) Applicant: ZHEJIANG SANHUA AUTOMOTIVE COMPONENTS CO., LTD., Zhejiang (CN)

(72) Inventors: Bin Song, Zhejiang (CN); Yuan Yao, Zhejiang (CN); Keli Ye, Zhejiang (CN); Rongrong Zhang, Zhejiang (CN)

(73) Assignee: ZHEJIANG SANHUA AUTOMOTIVE COMPONENTS CO., LTD, Zhejiang (CN)

( * ) Notice: Subject to any disclaimer, the term of this patent is extended or adjusted under 35 U.S.C. 154(b) by 419 days.

(21) Appl. No.: 17/917,565

(22) PCT Filed: Apr. 28, 2021

(86) PCT No.: PCT/CN2021/090450
§ 371 (c)(1),
(2) Date: Oct. 7, 2022

(87) PCT Pub. No.: WO2021/218985
PCT Pub. Date: Nov. 4, 2021

(65) Prior Publication Data
US 2023/0145891 A1 May 11, 2023

(30) Foreign Application Priority Data

Apr. 30, 2020 (CN) .......................... 20201362743.9

(51) Int. Cl.
*F28D 9/00* (2006.01)
*F28F 9/02* (2006.01)

(52) U.S. Cl.
CPC .......... *F28D 9/0062* (2013.01); *F28D 9/005* (2013.01); *F28F 9/0251* (2013.01); *F28F 9/027* (2013.01)

(58) Field of Classification Search
CPC ...... F28D 9/0043; F28D 9/005; F28D 9/0062; F28F 9/0251; F28F 9/027; F28F 27/02
See application file for complete search history.

(56) References Cited

U.S. PATENT DOCUMENTS 5,950,715 A * 9/1999 Jonsson ................. F28D 9/005
165/103
9,074,518 B2 * 7/2015 Kim ....................... F01P 11/08
(Continued)

FOREIGN PATENT DOCUMENTS

CN 206054875 A 3/2017
CN 106918165 A 7/2017
(Continued)

OTHER PUBLICATIONS

Extended European Search Report dated May 16, 2024 for European Application No. 21795628.3.
(Continued)

*Primary Examiner* — Eric S Ruppert
*Assistant Examiner* — Hans R Weiland
(74) *Attorney, Agent, or Firm* — Ohlandt, Greeley and Perle, L.L.P.

(57) ABSTRACT

A heat exchange device including a valve element component, a core body component and a connecting member having a first end and a second end, and the second end is provided with a welding section and an adjacent section; the core body component is provided with a welding matching portion; the welding section is welded to the welding matching portion, and the adjacent section is adjacent to the welding section; the outer diameter of the welding section is smaller than or equal to the inner diameter of the welding matching portion, and the outer diameter of the adjacent section is smaller than or equal to the inner diameter of the welding matching portion; and the distance between the end of the welding matching portion away from the valve (Continued)

element component and the end of the welding section away from the valve element component is larger than or equal to zero.

18 Claims, 7 Drawing Sheets

(56) References Cited

U.S. PATENT DOCUMENTS

| | | | | |
|---|---|---|---|---|
| 9,464,853 | B2* | 10/2016 | Sheppard | F28F 27/02 |
| 10,036,466 | B2* | 7/2018 | Kim | F16H 57/0417 |
| 10,989,481 | B2* | 4/2021 | Crawford | F28D 9/0093 |
| 2007/0090200 | A1 | 4/2007 | Lamb et al. | |
| 2013/0061630 | A1* | 3/2013 | Schaefer | F28D 9/005 |
| | | | | 62/502 |
| 2017/0030456 | A1* | 2/2017 | Zou | F28F 9/0075 |

FOREIGN PATENT DOCUMENTS

| | | |
|---|---|---|
| CN | 206574819 U | 10/2017 |
| CN | 207963237 U | 10/2018 |
| EP | 2565560 A2 | 3/2013 |
| EP | 3124907 A2 | 2/2017 |

OTHER PUBLICATIONS

International Search Report dated May 28, 2021 for PCT Appl. No. PCT/CN2021/090450.

* cited by examiner

HEAT EXCHANGE DEVICE

This application is a National Phase entry of PCT Application No. PCT/CN2021/090450, filed on Apr. 28, 2021, which claims the benefit of priority to Chinese Patent Application No. 202010362743.9, titled "HEAT EXCHANGE DEVICE", filed with the State Intellectual Property Office of People's Republic of China on Apr. 30, 2020, which are incorporated herein by reference in their entirety.

FIELD

The present application relates to the technical field of thermal management, and in particular to a heat exchange device.

BACKGROUND

A thermal management system includes a circuit for circulating a refrigerant. A heat exchanger and an expansion valve are required in the thermal management system, and the above two members are generally connected by pipelines in the thermal management system.

Various members of the heat exchanger are fixed by welding, and the heat exchanger may highly shrink after welding because of the melting of the solder during welding. Therefore, a valve body of the expansion valve may be fixed to a mounting plate of the heat exchanger in an integration of the heat exchanger and the expansion valve.

SUMMARY

An object of the present application is to provide a heat exchange device with good sealing performance.

A heat exchange device is provided according to an embodiment of the present application, which includes a valve core member, a core body member, and the valve core member is fixed to the core body member;

the core body member includes a plate portion, the plate portion includes multiple plates, the plate portion at least includes a first hole passage, a second hole passage and an inter-plate passage, and the first hole passage, the second hole passage and the inter-plate passage are in communication;

the heat exchange device includes a connecting member, the connecting member includes a first end portion and a second end portion, the first end portion is located in the first hole passage, the second end portion includes a welding section and an adjacent section, the core body member includes a welding matching portion, the welding section is welded to the welding matching portion, the adjacent section is adjacent to the welding section, an outer diameter of the welding section is smaller than or equal to an inner diameter of the welding matching portion, an outer diameter of the adjacent section is smaller than or equal to the inner diameter of the welding matching portion; and a distance between an end, away from the valve core member, of the welding matching portion and an end, away from the valve core member, of the welding section is greater than or equal to zero; and the valve core member includes a valve seat portion, the valve seat portion includes a bottom opening, a throttle hole and a peripheral opening, and the peripheral opening is in communication with the bottom opening through the throttle hole, and the peripheral opening is in communication with a part, outside the connecting member, of the first hole passage; the connecting member includes a communication chamber, and the bottom opening is in communication with the communication chamber of the connecting member.

The technical solution according to the present application includes the connecting member, the welding section of the connecting member is welded to the welding matching portion, the adjacent section is adjacent to the welding section, the outer diameter of the welding section is smaller than or equal to the inner diameter of the welding matching portion, and the outer diameter of the adjacent section is smaller than or equal to the inner diameter of the welding matching portion; in this way, since the connecting member includes the welding section and the adjacent section in a case that the core body member shrinks during welding, the distance between the end, away from the valve core member, of the welding matching portion and the end, away from the valve core member, of the welding section is larger than or equal to zero, so that the welding matching portion is movable relative to the connecting member during the welding shrinkage of the core body member, and the welding between the connecting member and the core body member has good sealing performance.

DETAILED DESCRIPTION OF THE EMBODIMENTS

Figure 1:
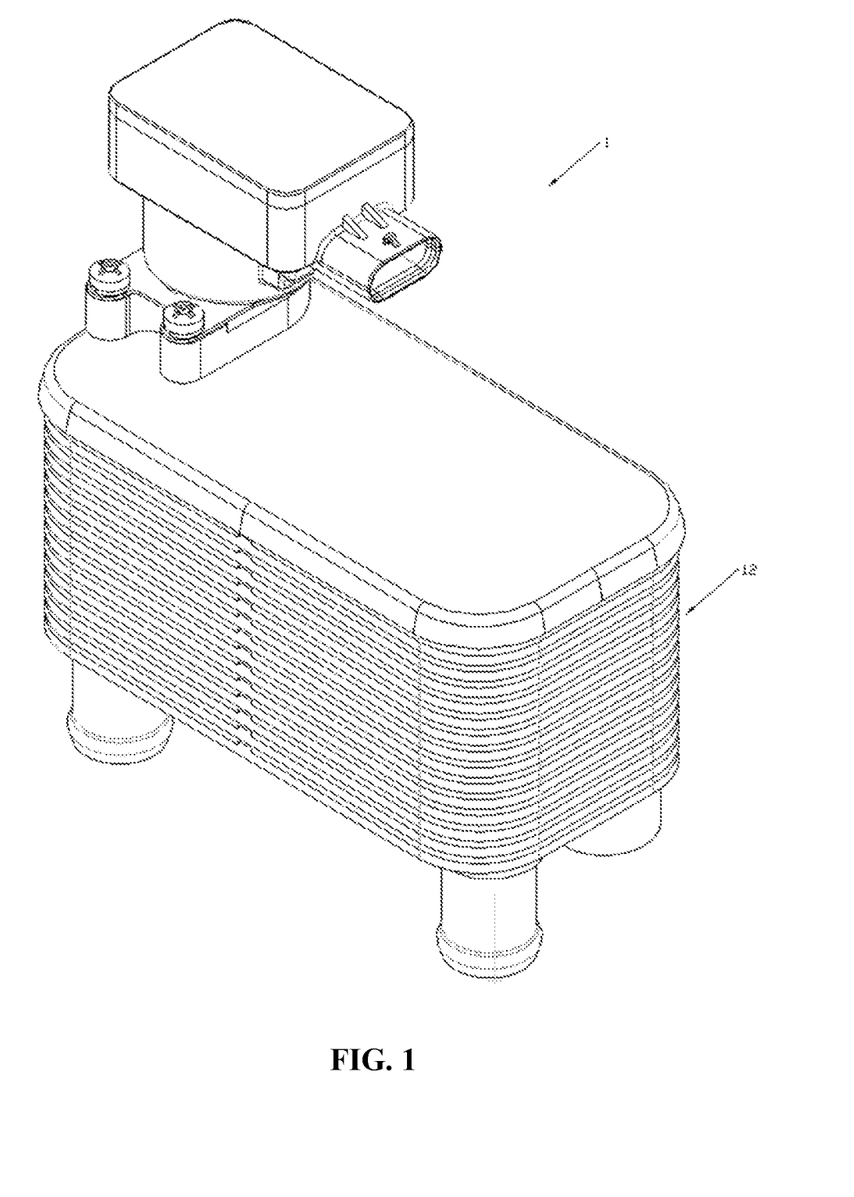
FIG. 1 is a schematic structural view of an embodiment of a heat exchange device.
Figure 2:
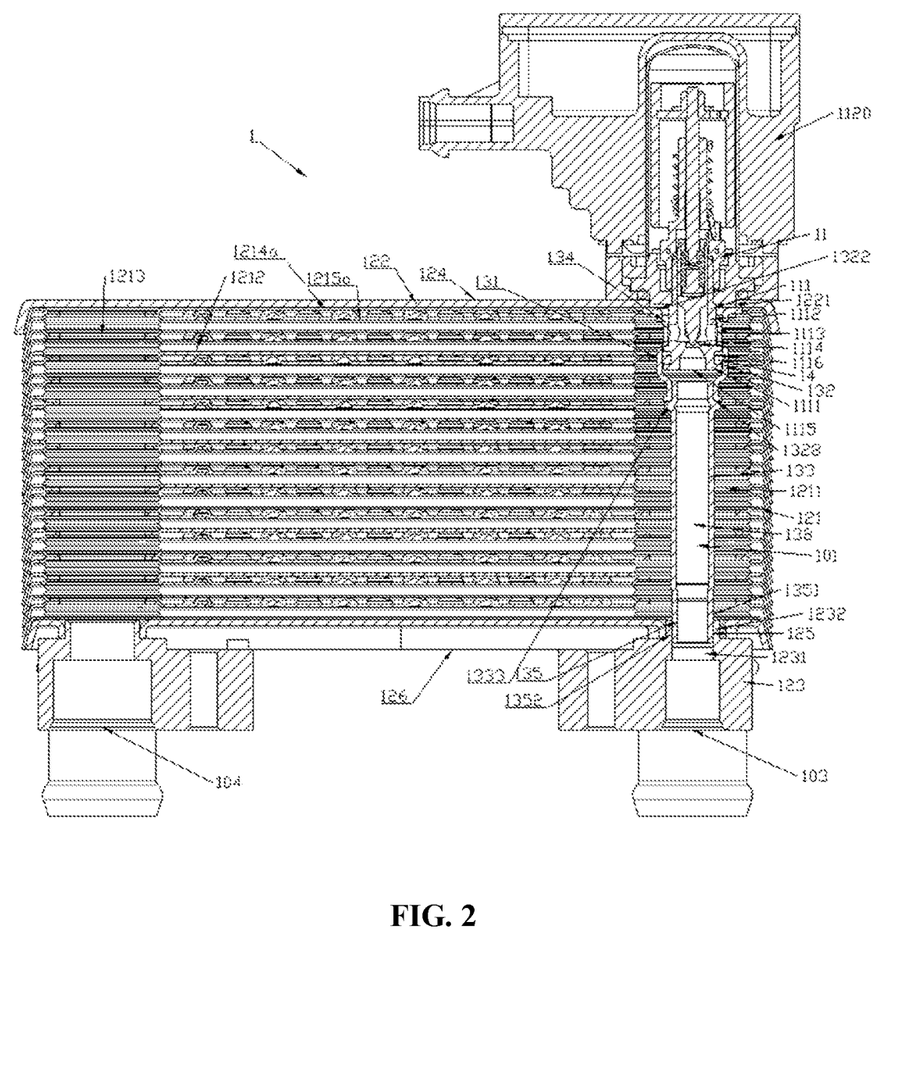
FIG. 2 is a schematic cross-sectional view of FIG. 1.
Figure 3:
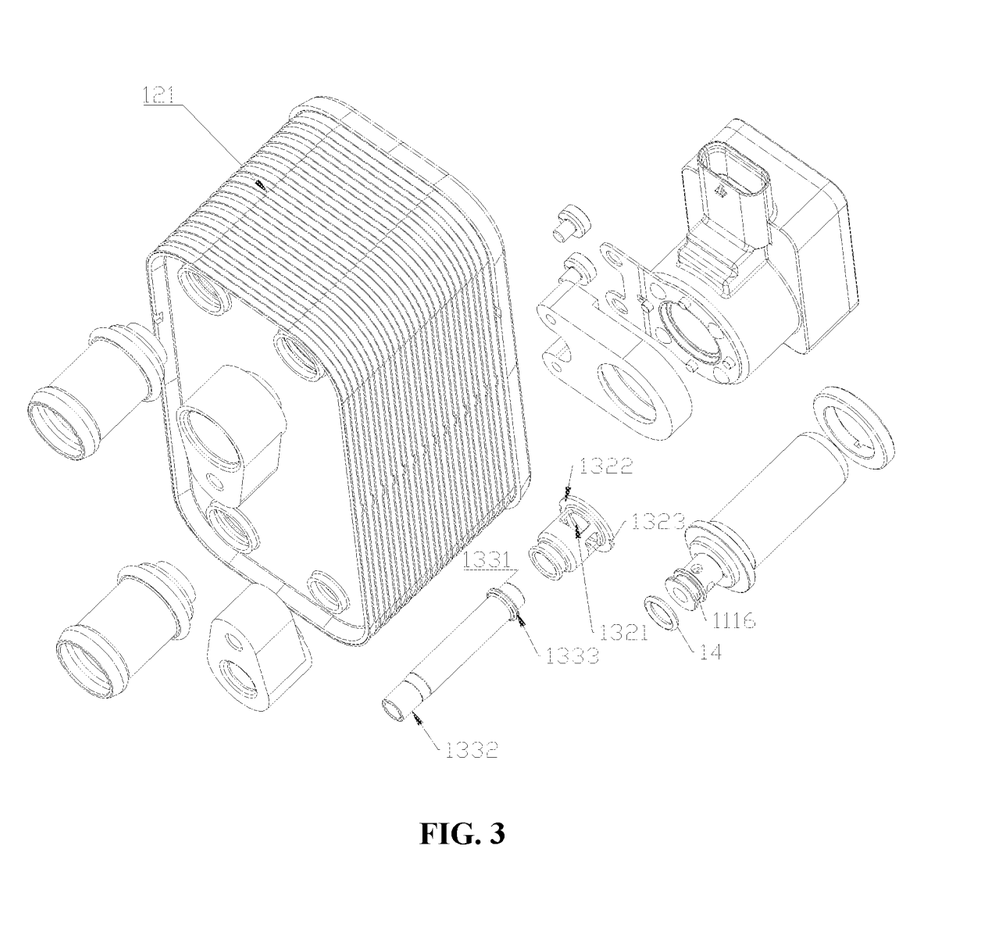
FIG. 3 is a schematic perspective exploded view of FIG. 1.

Referring to FIGS. 1 to 3, FIG. 1 is a schematic structural view of a heat exchange device 1.

The heat exchange device 1 at least includes a first flow passage 101 and a second flow passage, the fluid in the first flow passage 101 can exchange heat with the fluid in the second flow passage; the fluid in the first flow passage 101 may be a refrigerant, and the fluid in the second flow passage may be a coolant. The heat exchange device 1 may include a third flow passage, a fourth flow passage, and the like.

The heat exchange device 1 includes a valve core member 11, a core body member 12 and a connecting member 13, the valve core member 11 is assembled with and fixed to the core body member 12, and the connecting member 13 is fixed to the core body member 12, such as by welding. The valve core member 11 may be of, for example, a valve core structure of an expansion valve.

The core body member 12 includes a top pressing block 122, a plate portion 121 and a bottom pressing block 123, and the top pressing block 122, the plate portion 121 and the bottom pressing block 123 are fixed by welding. The plate portion 121 at least includes a first hole passage 1211, a second hole passage 1213 and an inter-plate passage 1212, the first hole passage 1211, the inter-plate passage 1212 and the second hole passage 1213 are in communication, and the first flow passage 101 includes part of the first hole passage 1211, the second hole passage 1213 and the inter-plate passage 1212.

Herein, the first hole passage 1211 and the second hole passage 1213 are hole passages when the core body member 12 is not assembled with the valve core member 11. After the first hole passage 1211 and the second hole passage 1213 are assembled with the valve core member or the connecting member, even if a member or part is located in other members, it still means that the member or the part herein is located in the first hole passage or the second hole passage as long as a position of the member is in the first hole passage or the second hole passage of the core body member.

The plate portion 121 includes multiple stacked plates, adjacent plates are fixed by welding, each plate at least includes a first hole and a second hole, the first holes of the plates are aligned and the second holes of the plates are aligned along a stacking direction of the plates. The first hole and the second hole are located adjacent to an edge of the plate, so that the fluid flowing through the plate can have a relatively long flow path, which is beneficial to improving the heat exchange efficiency. The first holes of the plates are aligned to form a part of the first hole passage 1211, and the second holes of the plates are aligned to form a part of the second hole passage 1213.

The top pressing block 122 includes a third hole 1221, the third hole 1221 is aligned with the first holes, and the "aligned" herein includes that the first holes is coaxial with the third hole, or, an axis of the first holes is parallel to an axis of the third hole; the bottom pressing bock 123 includes a communication hole 1231, the communication hole 1231 is aligned with the first holes, and the "aligned" herein includes that the first holes is coaxial with the third hole, or, the axis of the first holes is parallel to the axis of the third hole.

The heat exchange device 1 includes a communication passage 103 and another communication passage 104, the communication passage 103 is in communication with a communication chamber 138 of the connecting member 13, and the another communication passage 104 is in communication with the second hole passage 1213, so that the fluid can flow in from the communication passage 103 and flow through an inner chamber of the connecting member 13, and flow in the first flow passage and then flow in the inter-plate passage 1212 of the core body member 12 after being throttled by the valve core member 11, and the fluid exchanges heat with the fluid in the second flow passage in the inter-plate passage 1212, which has a simple flow path and high heat exchange efficiency. Alternatively, in other cases, the another communication passage 104 may be in indirect communication with the second hole passage 1213. For example, a pipe may be provided in the second hole passage 1213, and the second hole passage 1213 is in communication with the another communication passage 104 through the pipe. In other cases, the another communication passage 104 may not be in communication with the inter-plate passage 1212 through the second hole passage 1213, the another communication passage 104 and the communication passage 103 may be arranged on a same side of the core body member 12, and the another communication passage 104 may be adjacent to the communication passage 103 and in indirect communication with the communication passage 103.

The core body member 12 includes a first side portion 124 and a second side portion 126, at least part of the valve core member 11 is located on a side where the first side portion 124 is located, or in other words, the first side portion 124 of the core body member 12 refers to a side, provided with the valve core member 11, of the core body member 12. The communication passage 103 is located on a side where the second side portion 126 is located, and the communication passage 103 is in communication with the communication chamber 138. For example, the valve core member 11 includes a coil portion 1120, and the coil portion 1120 is located on the side where the first side portion 124 is located.

At least part of the valve core member 11 inserts into the first hole passage 1211, and at least part of the connecting member 13 inserts into the first hole passage 1211.

The valve core member 11 includes a valve seat portion 111, at least part of the valve seat portion 111 is located in the first hole passage 1211, the valve seat portion 111 includes a peripheral opening 1113, a throttle hole 1114 and a bottom opening 1115, the peripheral opening 1113 is in communication with the first hole passage 1211 and in communication with the inter-plate passage 1212, the connecting member 13 includes the communication chamber 138, one end of the connecting member 13 is located in the first hole passage 1211, the bottom opening 1115 is in communication with the communication chamber 138 of the connecting member 13, and the communication chamber 138 is not in direct communication with the first hole passage 1211. The valve core member 11 may be a valve core portion of an electronic expansion valve. In this way, the fluid from the communication chamber 138 of the connecting member 13 can flow in the inter-plate passage 1212 through the bottom opening 1115, the throttle hole 1114, the peripheral opening 1113 and the first hole passage 1211, so that the fluid can exchange heat with the fluid between adjacent plates inside the plate portion 121. The peripheral opening 1113 may be in direct communication with the first hole passage 1211, or may be in direct communication with the inter-plate passage 1212.

Herein, the communication chamber 138 is not in direct communication with the first hole passage 1211, which does not exclude a transfer communication between the communication chamber 138 and the first hole passage 1211 by providing other members.

The connecting member 13 includes an annular wall portion 131, the valve seat portion 111 and the annular wall portion 131 are sealedly arranged, and the sealing form may be a radial sealing or an axial sealing.

The valve seat portion 111 includes a bottom section 1111 and a middle section 1112, the bottom section 1111 includes the bottom opening 1115, the bottom section 1111 is located inside the connecting member 13, and a peripheral side of the bottom section 1111 and the annular wall portion 131 of the connecting member 13 are sealedly arranged. The middle section 1112 includes the peripheral opening 1113, the middle section 1112 is closer to the first side portion 124 of the core body member 12 than the bottom section 1111 in a stacking direction of the core body member 12, the middle section 1112 is located in the plate portion 121, and the peripheral opening 1113 is in communication with the inter-plate passage 1212. In this way, a depth of the valve core member 11 assembled to the core body member 12 is relatively deep, which is beneficial to reducing a height of the valve core member 11 protruding from the core body member 12, and the overall structure is more compact. When the valve core member is in an open state, the communication passage 103, the communication chamber 138, the bottom opening 1115, the throttle hole 1114, the peripheral opening 1113, the first hole passage 1211, the inter-plate passage 1212 and the second hole passage 1213 are in communication.

It should be noted that the bottom section and the middle section herein are merely defined by name, and are not limited in structure.

The connecting member 13 includes a valve seat matching portion 132 and a drainage pipe 133, the valve seat matching portion 132 is fixed to the valve seat portion 133, such as by welding or other fixing methods such as by riveting. The valve seat matching portion 132 is provided with the annular wall portion 131, and a height of the annular wall portion 131 is larger than a height of the bottom section 1111 along the stacking direction of the plates of the core body member 12. A first groove 1116 is defined in the bottom section 1111, the heat exchange device 1 includes a first sealing member 14, the first sealing member 14 is located in the first groove 1116, and the first sealing member 14 abuts against and closely cooperates with the annular wall portion 131 to realize sealing between the first sealing member 14 and the annular wall portion 131, which effectively avoids the leakage between the bottom section 1111 and the annular wall portion 131.

The valve seat matching portion 132 includes a side hole 1321, and the side hole 1321 is closer to the first side portion 124 of the core body member 12 than the annular wall portion along the stacking direction of the plates of the core body member 12. The side hole 1321 corresponds to the peripheral opening 1113 of the valve core member 11. In this way, the fluid from the bottom opening 1115 of the valve core member 11, flows in the first hole passage 1211 through the throttle hole 1114, the peripheral opening 1113 and the side hole 1321, and flows in the inter-plate passage 1212 in communication with the first hole passage 1211 to exchange heat with the fluid in the second flow passage. The throttling and depressurization of the refrigerant are competed inside the core body member 12, and the connection with the subsequent heat exchange links is smooth, which reduces the factors such as gas-liquid stratification of the refrigerant after throttling and depressurization in a long pipeline from affecting the heat exchange efficiency of the subsequent heat exchange by the pipeline arrangement.

The connecting member 13 is fixed to the core body member 12 by welding, the core body member 12 includes a welding matching portion 125, the welding matching portion 125 is fixed to the connecting member 13 by welding, and a thickness of the welding matching portion 125 is greater than a thickness of at least two stacked plates along an extending direction of the first hole passage 1211. In this way, since the welding matching portion 125 has the thickness greater than two stacked plates during the welding shrinkage process of the core body member 12, the connecting member 13 can be well welded to the welding matching portion 125 during welding, which is beneficial to stability of sealing.

The connecting member 13 includes a first end portion 134 and a second end portion 135, the first end portion 134 is located in the first hole passage 1211, the second end portion 135 of the connecting member 13 includes a welding section 1352 and an adjacent section 1351, the welding section 1352 of the connecting member 13 is welded to the welding matching portion 125, the adjacent section 1351 is adjacent to the welding section 1352, the adjacent section 1351 is closer to the first end portion 134 than the welding section 1352, an outer diameter of the welding section 1352 is smaller than or equal to an inner diameter of the welding matching portion 125, an outer diameter of the adjacent section 1351 is smaller than or equal to the inner diameter of the welding matching portion 125; since the connecting member has the welding section and the adjacent section in a case that the core body member shrinks during the welding, a distance between an end, away from the valve core member, of the welding matching portion and an end, away from the valve core member, of the welding section is larger than or equal to zero, so that the welding matching portion is movable relative to the connecting member during the welding shrinkage of the core body member, and the welding between the connecting member and the core body member has good sealing performance. In addition, the outer diameter of the adjacent section 1351 may be larger than or equal to the outer diameter of the welding section 1352, and the welding section 1352 can be reduced in diameter relative to the adjacent section 1351, which is more beneficial to the relative movement of the plate portion relative to the connecting member during the welding.

The valve seat matching portion 132 includes a flange portion 1322, and the flange portion 1322 is fixed to the core body member 12 by welding. The plates of the core body member 12 include a first plate 1214a and a second plate 1215a, the first plate 1214a is fixed to the second plate 1215a by welding, a top or a bottom of the flange portion 1322 is fixed to the first plate 1214a by welding; or the top or the bottom of the flange portion 1322 is fixed to the second plate 1215a by welding.

The core body member 12 includes the top pressing block 122, the flange portion 1322 is fixed to the top pressing block 122 by welding, and the valve seat portion 111 of the valve core member 11 inserts in from the third hole 1221 of the top pressing block 122. The valve seat matching portion 132 and the plate portion 121 are fixed and limited by the flange portion 1322. The flange portion 1322 is fixed to the top pressing block 122 of the core body member 12 when the plate portion 121 shrinks during welding, which can ensure the certainty of a position of the valve seat matching portion 132 in the core body member 12, and reduce the risk of affecting the position of the valve seat matching portion 132 after the plates shrink and reduce the risk of fluid leakage between the valve seat matching portion 132 and the valve seat.

The core body member 12 includes the bottom pressing block 123, part of the connecting member 13 inserts into the bottom pressing block 123, the bottom pressing block 123 includes the welding matching portion 125, the welding section 1352 is located in the bottom pressing block 123, the welding section 1352 is located in the welding matching portion 125, the welding section 1352 is fixed to the bottom pressing block 123 by welding, and the first end portion 134 is welded to the core body member 12 by welding. In this way, the connecting member 13 can be fixed to the core body member during the welding of the core body member, which can be completed by one-time welding, and the processing is convenient.

The valve seat matching portion 132 includes a bottom end portion 1328, the drainage pipe 133 is fixed to the bottom end portion 1328 by welding, and at least part of the drainage pipe 133 inserts into the valve seat matching portion 132; the drainage pipe 133 includes a first portion 1331 and a second portion 1332, at least part of the first portion 1331 inserts into the valve seat matching portion 132, and the at least part of the first portion 1331 is fixed to the valve seat matching portion 132 by welding. The second end portion of the connecting member 13 is arranged in the second portion of the drainage pipe 133, and part of the second portion 1332 of the drainage pipe 133 is located in the welding matching portion 125 and is fixed to the welding matching portion 125 by welding.

The bottom pressing block 123 includes a protrusion 1232, the protrusion 1232 inserts into the first hole passage 1211, the protrusion 1232 includes the communication hole 1231 in communication with the first hole passage 1211, the welding matching portion 125 is arranged on an inner wall of the protrusion 1232, the welding section inserts into the communication hole 1231 of the protrusion 1232, and an outer wall of the protrusion 1232 is fixed to the plate portion 121 by welding.

The drainage pipe 133 includes an external expansion portion 1333, the external expansion portion 1333 does not insert into the valve seat matching portion 132, and the external expansion portion 1333 cooperates with the bottom end portion 1328 of the valve seat matching portion 132 for limiting. In this way, since the plate portion 121 may shrink during the welding of the core body member 12, the drainage pipe 133 may be blocked by the external expansion portion 1333 and the bottom end portion of the valve seat matching portion 132 by providing the external expansion portion 1333 if the drainage pipe 133 moves upward toward the valve seat matching portion 132, so that a position of the drainage pipe 133 inserting into the valve seat matching portion 132 is determined, which reduces the risk of sealing fit between the bottom section 1111 and the connecting member 13 caused by the excessive depth of the drainage pipe 133 protruding into the valve seat matching portion 132, and reduces the influence on the flow passage between the bottom section 1111 and the drainage pipe 133.

Furthermore, the flange portion 1322 includes a limiting groove 1323, the first plate 1214a includes a limiting protrusion (not shown), and the limiting groove 1323 cooperates with the limiting protrusion to prevent the connecting member 13 form moving in a circumferential direction, which is beneficial to the stability of the structure and the stability of sealing.

Figure 4:
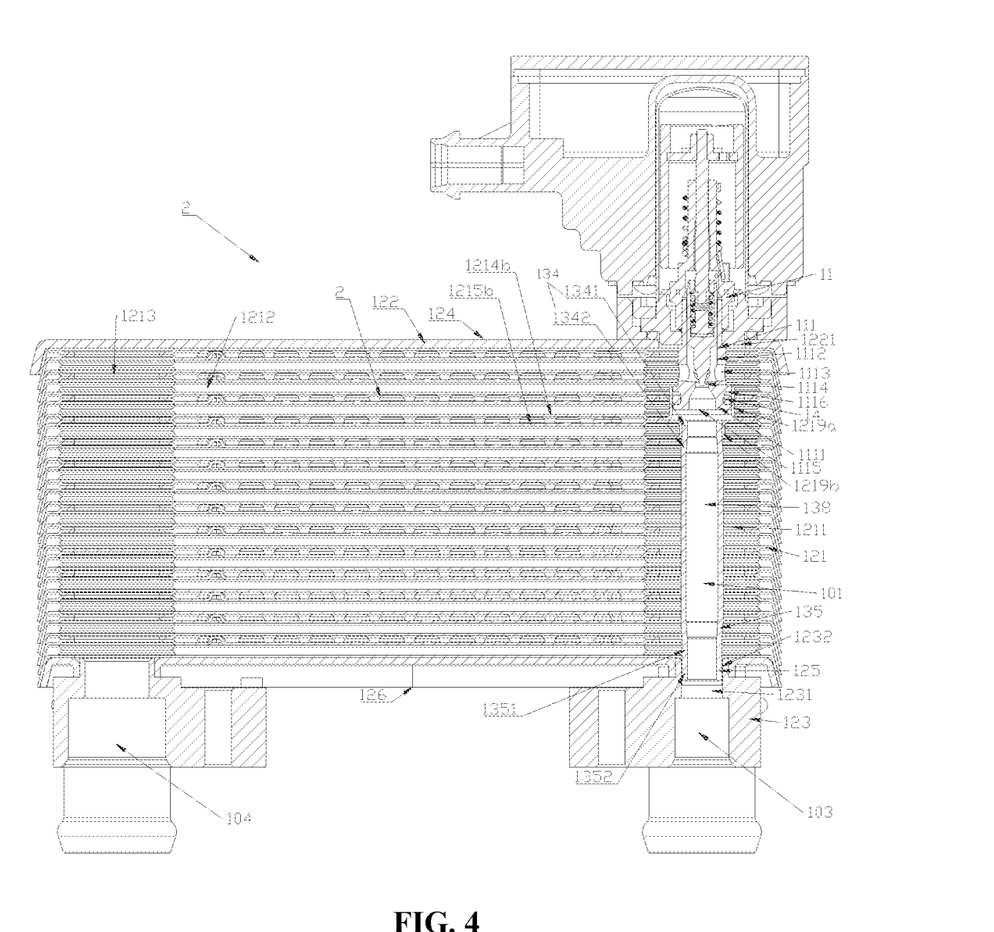
FIG. 4 is a schematic cross-sectional view of a second embodiment of the heat exchange device.
Figure 5:
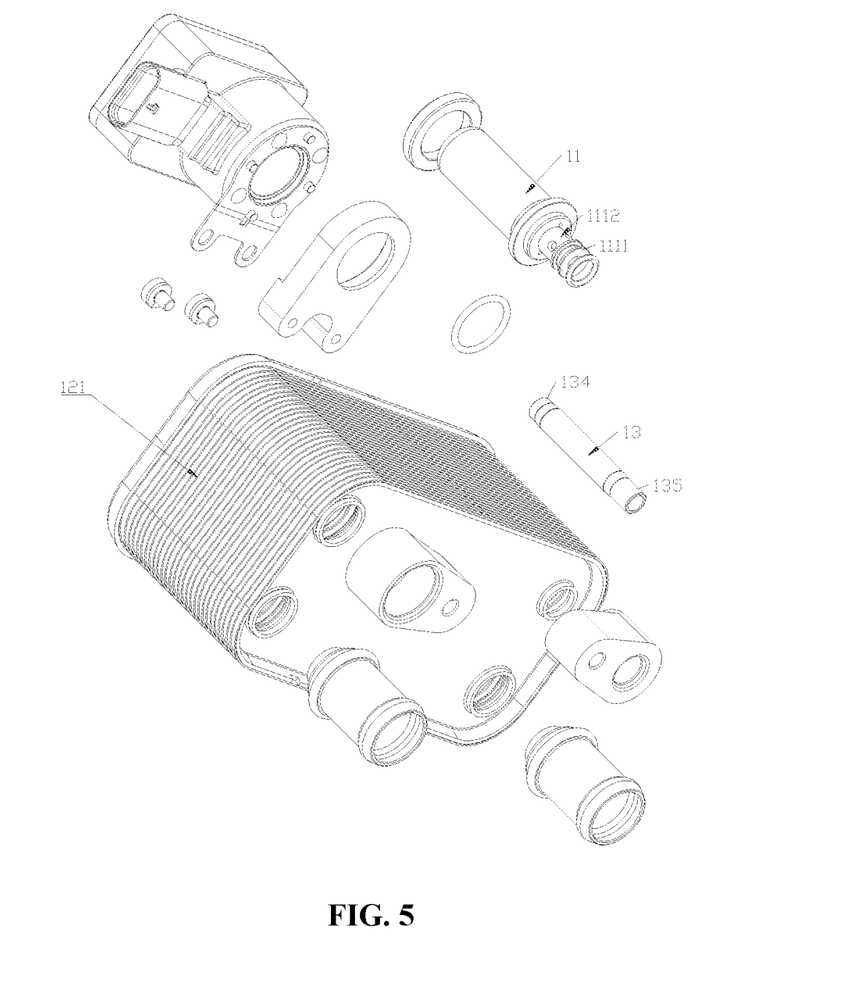
FIG. 5 is a schematic perspective exploded view of the heat exchange device shown in FIG. 4.

Referring to FIG. 4 and FIG. 5, FIG. 4 and FIG. 5 are schematic structural views of a heat exchange device 2. Although some reference numerals in FIG. 4 are not indicated below, the reference numerals of the same parts in the above embodiment are also marked in FIG. 4 to facilitate understanding and avoid repetition and redundancy.

The core body member 12 includes a third plate 1214b and a fourth plate 1215b, the third plate 1214b is fixed to the fourth plate 1215b by welding, the third plate 1214b includes a first annular protruding portion 1219a, the fourth plate 1215b includes a second annular protruding portion 1219b, a first hole is defined in the first annular protruding portion 1219a, a first hole is defined in the second annular protruding portion 1219b, the first hole passage 1211 extends through the first annular protruding portion 1219a and the second annular protruding portion 1219b, the first annular protruding portion 1219a inserts into the first hole of a plate adjacent to the third plate 1214b, the second annular protruding portion 1219b inserts into the first hole of a plate adjacent to the fourth plate 1215b, a gap is left between the first annular protruding portion 1219a and a wall portion of the first hole defined in the plate adjacent to the third plate 1214b, and a gap is left between the second annular protruding portion 1219b and a wall portion of the first hole defined in the plate adjacent to the fourth plate 1215b, so that the fluid can flow through an outer periphery of the first annular protruding portion 1219a and flow in the inter-plate passage 1212 for heat exchange.

The valve core member 11 includes the valve seat portion 111, at least part of the valve seat portion 111 is located in the first hole passage 1211, the valve seat portion 111 includes the peripheral opening 1113, the throttle hole 1114 and the bottom opening 1115, the peripheral opening 1113 is in communication with the first hole passage 1211, and the bottom opening 1115 is in communication with the communication chamber 138 of the connecting member 13. The valve core member 11 may be a valve core portion of an electronic expansion valve.

The valve seat portion 111 includes the bottom section 1111 and the middle section 1112, the bottom section 1111 includes the bottom opening 1115, the middle section 1112 includes the peripheral opening 1113, and the middle section 1112 is closer to the first side portion 124 of the core body member 12 than the bottom section 1111 in the stacking direction of the core body member 12. The middle section 1112 is located in the first hole passage 1211, so that a depth of the valve core member 11 assembled to the core body member 12 is relatively deep, which is beneficial to reducing a height of the valve core member 11 protruding from the core body member 12, and the overall structure is more compact. The first side portion 124 of the valve core member 12 refers to a side of the core body member 12 provided with the valve core member 11.

At least part of the valve seat portion 111 inserts into the first annular protruding portion 1219a, and the bottom section 1111 and the annular protruding portion 1219a are sealedly arranged; the first groove 1116 is defined in the bottom section 1111, the heat exchange device 1 includes the first sealing member 14, the first sealing member 14 is located in the first groove 1116, and the first sealing member 14 closely cooperates with the annular protruding portion 1219a to realize sealing between the first sealing member 14 and the annular protruding portion 1219a, which effectively avoids the leakage between the bottom section 1111 and the annular protruding portion 1219a.

A side where the core body member 12 is provided with the valve core member 11 is defined as an upper side, and the middle section 1112 is located on the upper side of the connecting member 13; the fluid flows in from the bottom opening 1115, and flows out of the peripheral opening 1113 after flowing through the throttle hole 1114, so that the fluid that has just flowed in the core body member 12 flows out of the peripheral opening 1113 after being throttled and depressurized by the expansion valve, and flows in the inter-plate passage 1212 to exchange heat with the fluid in the second flow passage. The throttling and depressurization of the refrigerant are competed inside the core body member 12, and the connection with the subsequent heat exchange links is smooth, which reduces the factors such as gas-liquid stratification of the refrigerant after throttling and depressurization in a long pipeline from affecting the heat exchange efficiency of the subsequent heat exchange by the pipeline arrangement.

The connecting member 13 includes the first end portion 134 and the second end portion 135, and at least part of the first end portion 134 is fixed to the second annular protruding portion 1219b by welding. Specifically, at least part of the first end portion 134 inserts into the second annular protruding portion 1219b, and at least part of an outer wall of the first end portion 134 is fixed to an inner wall of the second annular protruding portion 1219b by welding. For example, a welding ring may be provided during welding.

At least part of the second end portion 135 is fixed to the bottom pressing block 123 by welding, and the at least part of the second end portion 135 inserts into a position where the first hole is defined in the bottom pressing block 123.

The first end portion 134 includes a first section 1341 and a second section 1342, the first section 1341 of the first end portion 134 inserts into the second annular protruding portion 1219b, the second section 1342 does not insert into the second annular protruding portion 1219b, an outer diameter of the second section 1342 is greater than an outer diameter of the first section 1341, and the outer diameter of the second section 1342 is greater than an inner diameter of the second annular protruding portion 1219b. For example, the outer diameter of the second section 1342 may be reduced toward the first section 1341. In this way, the plate may shrink when the stacked plates are fed into a furnace for welding, which results in a reduction in height of the stacked core body member 12. At this time, the first end portion 134 of the connecting member is difficult to insert into the bottom opening 1115 of the bottom section 1111 during the shrinkage of the plates by providing the second section 1342, which reduces the influence on the bottom section 1111 caused by the change in height caused by shrinkage of the connecting member 13 during the welding of the core body member 12, is beneficial to improving the cooperation between the valve core member 11 and the core body member 12, and is beneficial to improving the sealing between the valve core member 11 and the core body member 12 of the fluid.

In addition, the second end portion 135 of the connecting member 13 includes a welding section 1352 and an adjacent section 1351, the welding section 1352 of the connecting member 13 is welded to the welding matching portion 125, the adjacent section 1351 is adjacent to the welding section 1352, the adjacent section 1351 is closer to the first end portion 134 than the welding section 1352, the outer diameter of the welding section 1352 is smaller than or equal to the inner diameter of the welding matching portion 125, and the outer diameter of the adjacent section 1351 is smaller than or equal to the inner diameter of the welding matching portion 125; since the connecting member has the welding section and the adjacent section in a case that the core body member shrinks during the welding, the distance between the end, away from the valve core member 11, of the welding matching portion 125 and the end, away from the valve core member 11, of the welding section is larger than or equal to zero, so that the welding matching portion 125 is movable relative to the connecting member 13 during the welding shrinkage of the core body member 12, and the welding between the connecting member 13 and the core body member 12 has good sealing performance. In addition, the outer diameter of the adjacent section 1351 may be greater than or equal to the outer diameter of the welding section 1352, and the welding section 1352 can be reduced in diameter relative to the adjacent section 1351, which is more beneficial to the relative movement of the plate portion relative to the connecting member 13 during the welding.

The welding section 1352 may include a first zone section and a second zone section, the first zone section is welded to the welding matching portion 125, the second zone section is adjacent to the first zone section, the second zone section is farther away from the first end portion than the first zone section, and an outer diameter of the second zone section is smaller than or equal to an inner diameter of the first zone section; the first zone section may not be arranged correspondingly to the welding matching portion 125 when the connecting member 13 is assembled into the core body member 12, and the first zone section moves to the welding matching portion 125 and is fixed to the welding matching portion 125 by welding when the core body member shrinks.

Figure 6:
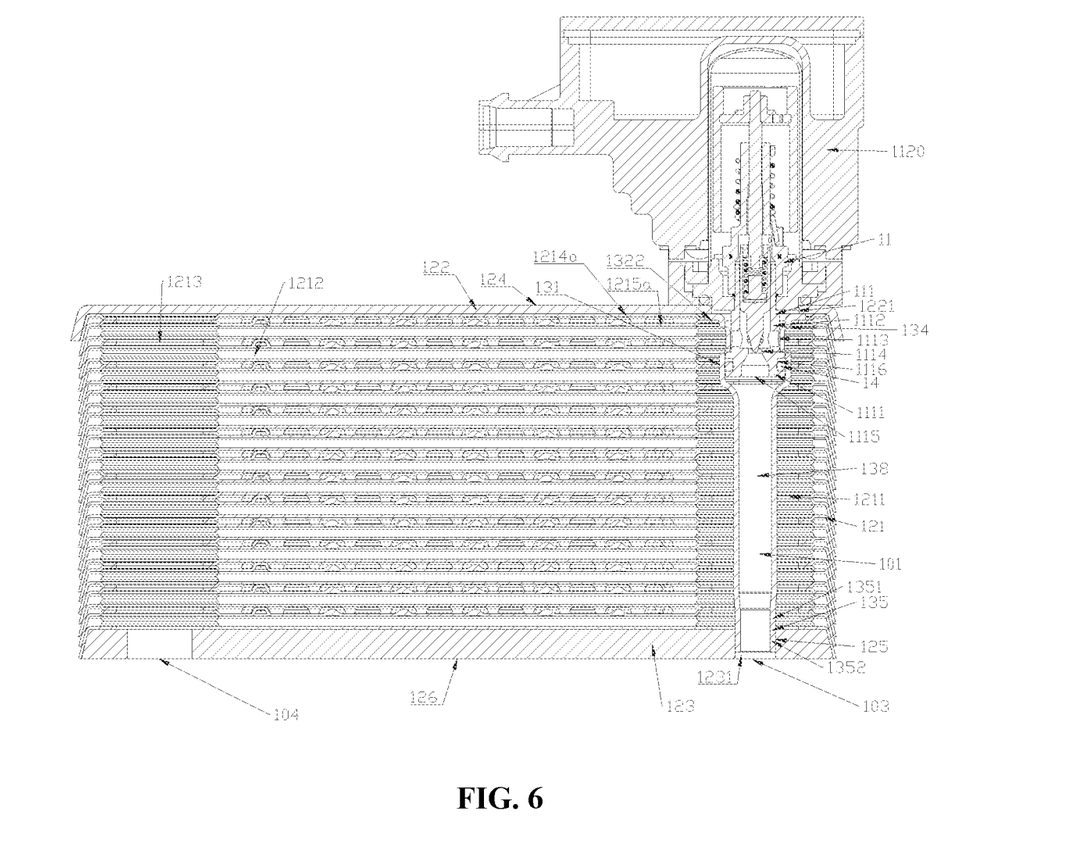
FIG. 6 is a schematic cross-sectional view of another embodiment of the heat exchange device.

Referring to FIG. 6, FIG. 6 is a schematic cross-sectional view of a heat exchange device. In order to show the structures more clearly, the following structures may not be shown in FIG. 6, but reference can be made to FIG. 2 and FIG. 3. Although some reference numerals in FIG. 6 are not indicated below, the same reference numerals of the same parts in the above embodiments are also marked in FIG. 6 to facilitate understanding and avoid repetition and redundancy.

The heat exchange device at least includes the first flow passage 101 and the second flow passage, the fluid in the first flow passage 101 can exchange heat with the fluid in the second flow passage; the fluid in the first flow passage 101 may be a refrigerant, and the fluid in the second flow passage may be a coolant. The heat exchange device may include a third flow passage, a fourth flow passage, and the like.

The heat exchange device 1 includes the valve core member 11, the core body member 12 and the connecting member 13, the valve core member 11 is assembled with and fixed to the core body member 12, and the connecting member 13 is fixed to the core body member 12, such as by welding. The valve core member 11 may be of, for example, a valve core structure of an expansion valve.

The core body member 12 includes the top pressing block 122, the plate portion 121 and the bottom pressing block 123, and the top pressing block 122, the plate portion 121 and the bottom pressing block 123 are fixed by welding. The plate portion 121 at least includes the first hole passage 1211, the second hole passage 1213 and the inter-plate passage 1212, the first hole passage 1211, the inter-plate passage 1212 and the second hole passage 1213 are in communication, and the first flow passage 101 includes part of the first hole passage 1211, the second hole passage 1213 and the inter-plate passage 1212. The first hole passage 1121 and the second hole passage 1213 are hole passages when the core body member 12 is not assembled with the valve core member 11.

The plate portion 121 includes multiple stacked plates, adjacent plates are fixed by welding, each plate at least includes a first hole and a second hole, the first holes of the plates are aligned and the second holes of the plates are aligned along the stacking direction of the plates. The first hole and the second hole are located adjacent to the edge of the plate, so that the fluid flowing through the plate can have a relatively long flow path, which is beneficial to improving the heat exchange efficiency. The first holes of the plates are aligned to form a part of the first hole passage 1211, and the second holes of the plates are aligned to form a part of the second hole passage 1213.

The top pressing block 122 includes the third hole 1221, the third hole 1221 is aligned with the first holes, the bottom pressing bock 123 includes the communication hole 1231, and the communication hole 1231 is aligned with the first holes.

The heat exchange device includes the communication passage 103 and the another communication passage 104, the communication passage 103 is in communication with the communication chamber 138 of the connecting member 13, and the another communication passage 104 is in communication with the second hole passage 1213, so that the fluid can flow in from the communication passage 103 and flow through the inner chamber of the connecting member 13, and then flow in the inter-plate passage 1212 of the core body member 12 after being throttled by the valve core member 11 to exchange heat with the fluid in the second flow passage, which has a simple flow path and high heat exchange efficiency. Alternatively, in other cases, the another communication passage 104 may be in indirect communication with the second hole passage 1213. For example, a pipe may be provided in the second hole passage 1213, and the second hole passage 1213 is in communication with the another communication passage 104 through the pipe. In other cases, the another communication passage 104 may not be in communication with the inter-plate passage 1212 through the second hole passage 1213, the another communication passage 104 may be arranged on a side, provided with the communication passage 103, of the core body member 12, and the another communication passage 104 may be adjacent to the communication passage 103 and not in direct communication with the communication passage 103.

At least part of the valve core member 11 inserts into the first hole passage 1211, and at least part of the connecting member 13 inserts into the first hole passage 1211.

The valve core member 11 includes the valve seat portion 111, at least part of the valve seat portion 111 is located in the first hole passage 1211, the valve seat portion 111 includes the peripheral opening 1113, the throttle hole 1114 and the bottom opening 1115, the peripheral opening 1113 is in communication with the first hole passage 1211, and the bottom opening 1115 is in communication with the communication chamber 138 of the connecting member 13. The valve core member 11 may be a valve core portion of an electronic expansion valve.

The valve seat portion 111 includes the bottom section 1111 and the middle section 1112, the bottom section 1111 includes the bottom opening 1115, the bottom section 1111 is located inside the connecting member 13, and the peripheral side of the bottom section 1111 and the annular wall portion 131 of the connecting member 13 are sealedly arranged. The middle section 1112 includes the peripheral opening 1113, the middle section 1112 is closer to the first side portion 124 of the core body member 12 than the bottom section 1111 along the stacking direction of the core body member 12, the middle section 1112 is located in the plate portion 121, and the peripheral opening 1113 is in communication with the inter-plate passage 1212. In this way, a depth of the valve core member 11 assembled to the core body member 12 is relatively deep, which is beneficial to reducing a height of the valve core member 11 protruding from the core body member 12, and the overall structure is more compact.

The connecting member 13 includes the annular wall portion 131, and the valve seat portion 111 and the annular wall portion 131 are sealedly arranged. A height of the annular wall portion 131 is larger than a height of the bottom section 1111 along the stacking direction of the plates of the core body member 12. The first groove 1116 is defined in the bottom section 1111, the heat exchange device includes the first sealing member 14, the first sealing member 14 is located in the first groove 1116, and the first sealing member 14 closely cooperates with the annular wall portion 131 to realize sealing between the first sealing member 14 and the annular wall portion 131, which effectively avoids the leakage between the bottom section 1111 and the annular wall portion 131.

The connecting member 13 includes a side hole 1321, and the side hole 1321 is closer to the first side portion 124 of the core body member 12 than the annular wall portion 131 along the stacking direction of the plates of the core body member 12. The side hole 1321 corresponds to the peripheral opening 1113 of the valve core member 11. In this way, the fluid flows in from the bottom opening 1115 of the valve core member 11 through the drainage pipe 133, and flows in the first hole passage 1211 through the throttle hole 1114, the peripheral opening 1113 and the side hole 1321, and then flows in the inter-plate passage 1212 in communication with the first hole passage 1211 to exchange heat with the fluid in the second flow passage.

The connecting member 13 includes the flange portion 1322, and the flange portion 1322 is fixed to the core body member 12 by welding. The plates of the core body member 12 include the first plate 1214a and the second plate 1215a, the first plate 1214a is fixed to the second plate 1215a by welding, the top or the bottom of the flange portion 1322 is fixed to the first plate 1214a by welding; or the top or the bottom of the flange portion 1322 is fixed to the second plate 1215a by welding.

The core body member 12 includes the top pressing block 122, and the flange portion 1322 is fixed to the top pressing block 122 by welding. The valve seat matching portion 132 and the plate portion 121 are fixed and limited by the flange portion 1322. The flange portion 1322 is fixed to the top pressing block 122 of the core body member 12 during the welding shrinkage of the plate portion 121, which can ensure the certainty of the position of the connecting member 13 in the core body member 12, and reduce the risk of affecting the position of the connecting member 13 after the plates shrink and reduce the risk of fluid leakage between the connecting member 13 and the valve seat portion 111.

The core body member 12 includes the bottom pressing block 123, part of the connecting member 13 inserts into the bottom pressing block 123, the bottom pressing block 123 includes the welding matching portion 125, the second end portion 135 inserts into the welding matching portion 125, and the second end portion 135 is fixed to the bottom pressing block 123 by welding.

The bottom pressing block 123 includes the communication hole 1231 in communication with the first hole passage 1211, the welding matching portion 125 is arranged on an inner wall of the communication hole 1231 of the bottom pressing block 123, at least part of the second end portion 135 inserts into the communication hole 1231, and a thickness of the bottom pressing block 123 is greater than a thickness of five plates. In this way, the bottom pressing block 123 can be welded to an outer wall of the connecting member 13 to ensure sealing during the welding of the core body member 12.

The second end portion 135 of the connecting member 13 includes the welding section 1352 and the adjacent section 1351, the welding section 1352 of the connecting member 13 is welded to the welding matching portion 125, the adjacent section 1351 is adjacent to the welding section 1352, the adjacent section 1351 is closer to the first end portion 134 than the welding section 1352, the outer diameter of the welding section 1352 is smaller than or equal to the inner diameter of the welding matching portion 125, and the outer diameter of the adjacent section 1351 is smaller than or equal to the inner diameter of the welding matching portion 125; since the connecting member has the welding section and the adjacent section in a case that the core body member shrinks during the welding, the distance between the end, away from the valve core member, of the welding matching portion and the end, away from the valve core member, of the welding section is larger than or equal to zero, so that the welding matching portion is movable relative to the connecting member during the welding shrinkage of the core body member, and the welding between the connecting member and the core body member has good sealing performance. In addition, the outer diameter of the adjacent section 1351 may be greater than or equal to the outer diameter of the welding section 1352, and the welding section 1352 can be reduced in diameter relative to the adjacent section 1351, which is more beneficial to the relative movement of the plate portion relative to the connecting member during the welding.

Figure 7:
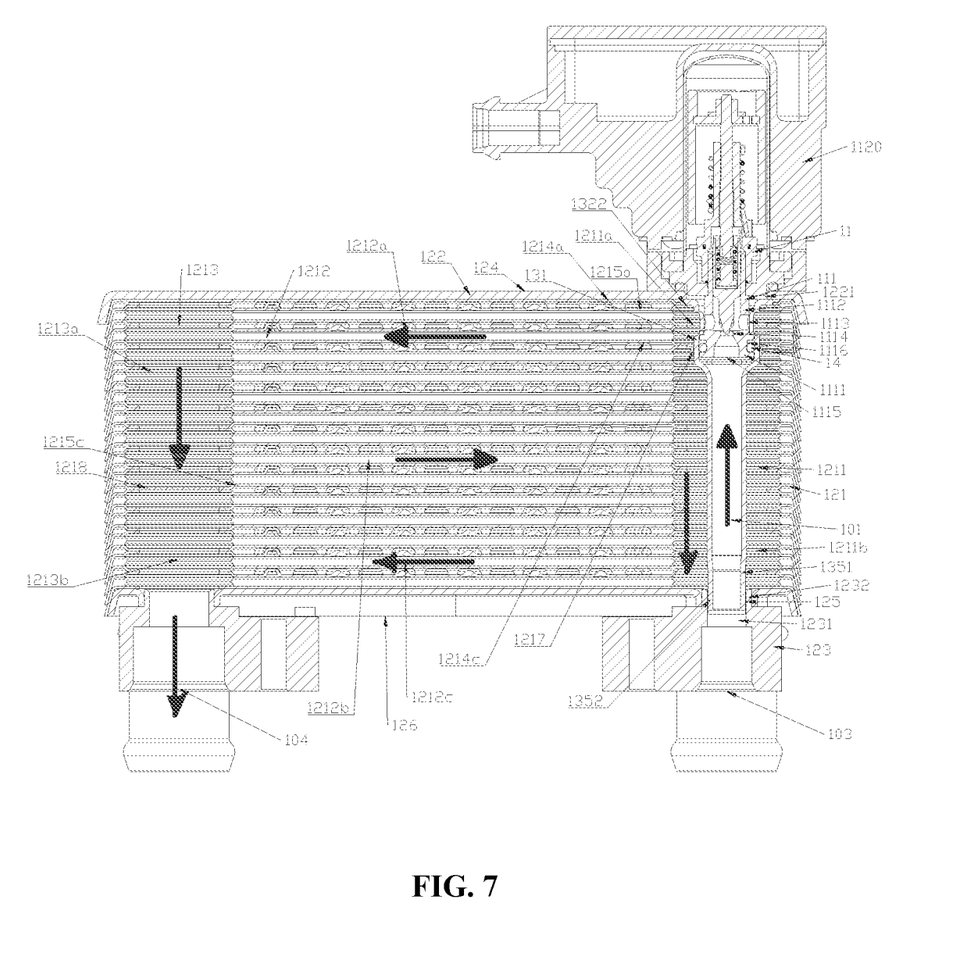
FIG. 7 is schematic cross-sectional view of yet another embodiment of the heat exchange device.

Referring to FIG. 7, FIG. 7 is a schematic cross-sectional view of yet another embodiment of the heat exchange device. A general structure of the heat exchange device refers to the heat exchange device shown in FIG. 6. Although some reference numerals in FIG. 7 are not indicated below, the same reference numerals of the same parts in the above embodiment are also marked in FIG. 7 to facilitate understanding and avoid repetition and redundancy. The valve body member 12 includes a fifth plate 1214*c*, the fifth plate 1214*c* includes an extension portion 1217, and the extension portion 1217 is fixed to the outer wall of the connecting member 13 by welding. The side where the core body member 12 is assembled with the valve core member 11 is an upper side, and the extension portion 1217 is located on a lower side of the middle section 1112.

The first hole passage 1211 includes a first sub hole passage 1211*a* and a second sub hole passage 1211*b*, and the extension portion 1217 is fixed to the outer wall of the connecting member 13 by welding to separate the first sub hole passage 1211*a* from the second sub hole passage 1211*b*.

The valve body member 12 includes a sixth plate 1215*c*, the sixth plate 1215*c* includes a blocking portion 1218, the blocking portion 1218 is located in the second hole passage 1213, the second hole passage 1213 includes a third sub hole passage 1213*a* and a fourth sub hole passage 1213*b*, and the blocking portion 1218 separates the third sub hole passage 1213*a* from the fourth sub hole passage 1213*b*.

The inter-plate passage 1212 includes a first route 1212*a*, a second route 1212*b* and a third route 1212*c*, a flow direction of the first route 1212*a* is opposite to a flow direction of the second route 1212*b*, and the flow direction of the second route 1212*b* is opposite to a flow direction of the third route 1212*c*; in this way, the fluid flows in from the bottom opening 1115 after it flows in the connecting member 13 through the communication passage 103, and then flows in the first sub hole passage 1211*a*, the first route 1212*a*, the third hole passage 1213*a*, the second route 1212*b*, the second hole passage 1211*b*, the third route 1212*c* and the another communication passage 104 through the throttle hole 1114 and the peripheral opening 1113. The fluid can realize throttling and depressurization after flowing in the heat exchange device, and the fluid flowing in the inter-plate passage 1212 from the peripheral opening 1113 can directly exchange heat with the fluid in the adjacent inter-plate passage 1212, and the throttling and heat exchange can be completed inside the core body member 12, which not only is beneficial to the stability of phase state of the fluid, but also is beneficial to improving the heat exchange efficiency.

The second end portion 135 of the connecting member 13 includes the welding section 1352 and the adjacent section 1351, the welding section 1352 of the connecting member 13 is welded to the welding matching portion 125, the adjacent section 1351 is adjacent to the welding section 1352, the adjacent section 1351 is closer to the first end portion 134 than the welding section 1352, the outer diameter of the welding section 1352 is smaller than or equal to the inner diameter of the welding matching portion 125, and the outer diameter of the adjacent section 1351 is smaller than or equal to the inner diameter of the welding matching portion 125; since the connecting member has the welding section and the adjacent section in a case that the core body member shrinks during the welding, the distance between the end, away from the valve core member, of the welding matching portion and the end, away from the valve core member, of the welding section is larger than or equal to zero, so that the welding matching portion is movable relative to the connecting member during the welding shrinkage of the core body member, and the welding between the connecting member and the core body member has good sealing performance. In addition, the outer diameter of the adjacent section 1351 may be larger than or equal to the outer diameter of the welding section 1352, and the welding section 1352 can be reduced in diameter relative to the adjacent section 1351, which is more beneficial to the relative movement of the plate portion relative to the connecting member during the welding.

Along an extending direction of the first hole passage, a thickness of the welding matching portion is greater than or equal to a thickness of two stacked plates, or the thickness of the welding matching portion may be larger than or equal to the thickness of five stacked plates.

The welding section 1352 may include the first zone section and the second zone section, the first zone section is welded to the welding matching portion 125, the second zone section is adjacent to the first zone section, the second zone section is farther away from the first end portion than the first zone section, and the outer diameter of the second zone section is smaller than or equal to the inner diameter of the first zone section; the first zone section may not be arranged corresponding to the welding matching portion 125 when the connecting member 13 is assembled into the core body member 12, and the first zone section moves to the welding matching portion 125 and is fixed to the welding matching portion 125 by welding when the core body member shrinks.

It should be noted that the above is only an example, the extension portion 1217 may be formed by stamping integrally with the fifth plate, or may be formed by welding with the fifth plate. Alternatively, as other embodiments, the extension portion may protrude from the connecting member, or the extension portion may be welded to the connecting member.

It should be noted that the above embodiments are only used to illustrate the present application rather than limit the technical solutions described in the present application, for example, the definition of directionality such as "front", "rear", "left", "right", "up" and "down". Although the present application has been described in detail herein with reference to the above embodiments, those of ordinary skill in the art should understand that the present application may still be combined, modified or equivalently replaced by those skilled in the art, and all technical solutions and its improvements that do not depart from the spirit and scope of the present application should be covered by the scope of the claims of the present application.

What is claimed is:

1. A heat exchange device, comprising a valve core member and a core body member, wherein the valve core member is fixed to the core body member;

the core body member comprises a plate portion, the plate portion comprises a plurality of plates, the plate portion at least comprises a first hole passage, a second hole passage and an inter-plate passage, and, the first hole passage, the inter-plate passage and the second hole passage are in communication;

the heat exchange device comprises a connecting member, the connecting member comprises a first end portion and a second end portion, the first end portion is located in the first hole passage, the second end portion comprises a welding section and an adjacent section, the core body member comprises a welding matching portion, the welding section is welded to the welding matching portion, the adjacent section is adjacent to the welding section, an outer diameter of the welding section is smaller than or equal to an inner diameter of the welding matching portion, an outer diameter of the adjacent section is smaller than or equal to the inner diameter of the welding matching portion; and a distance between an end, away from the valve core member, of the welding matching portion and an end, away from the valve core member, of the welding section is greater than or equal to zero; and the valve core member comprises a valve seat portion, the valve seat portion comprises a bottom opening, a throttle hole and a peripheral opening, the peripheral opening is in communication with the bottom opening through the throttle hole, and the peripheral opening is in communication with the first hole passage; the connecting member comprises a communication chamber, and the bottom opening is in communication with the communication chamber of the connecting member.

2. The heat exchange device according to claim 1, wherein:
a thickness of the welding matching portion is larger than a thickness of at least two stacked plates along an extending direction of the first hole passage;
the core body member comprises a bottom pressing block, the bottom pressing block comprises the welding matching portion, the welding section of the connecting member is located inside the bottom pressing block, the first end portion is fixed to the core body member by welding, and the welding section is fixed to the bottom pressing block by welding.

3. The heat exchange device according to claim 2, wherein the bottom pressing block comprises a protrusion, the protrusion inserts into the first hole passage, the protrusion comprises a communication hole, the welding matching portion is arranged on an inner wall of the protrusion, at least part of the second end portion is located in the communication hole of the protrusion, and an outer wall of the protrusion is fixed to the plate portion by welding.

4. The heat exchange device according to claim 2, wherein the bottom pressing block comprises a communication hole in communication with the first hole passage, the welding matching portion is arranged on an inner wall of the communication hole of the bottom pressing block, at least part of the second end portion is located in the communication hole, and the thickness of welding matching portion is larger than a thickness of five plates.

5. The heat exchange device according to claim 1, wherein:
the connecting member comprises a flange portion, which protrudes along a radial direction of the connecting member;
the plate portion comprises a first plate and a second plate, the first plate is fixed to the second plate by welding, and a top or a bottom of the flange portion is fixed to the first plate by welding; or, the top or the bottom of the flange portion is fixed to the second plate by welding;
and/or, the core body member comprises a top pressing block, and the flange portion is fixed to the top pressing block by welding.

6. The heat exchange device according to claim 1, wherein:

the core body member comprises a first side portion and a second side portion, at least part of the valve core member is located on a side where the first side portion is located, the heat exchange device comprises a communication passage, the communication passage is located on a side where the second side portion is located, and the communication passage is in communication with the communication chamber;
at least part of the valve seat portion inserts into the first end portion, and the outer diameter of the adjacent section is larger than or equal to the outer diameter of the welding section.

7. The heat exchange device according to claim 1, wherein:
the connecting member comprise a valve seat matching portion and a drainage pipe, the valve seat matching portion and the valve seat portion are sealedly arranged,
the valve seat matching portion comprises a bottom end portion, the drainage pipe is fixed to the bottom end portion by welding, and part of the drainage pipe is located in the valve seat matching portion;
the drainage pipe comprises an external expansion portion, the valve seat matching portion is closer to the valve seat portion than the external expansion portion along a stacking direction of the core body member, and the external expansion portion cooperates with the bottom end portion of the valve seat matching portion for achieving limiting.

8. The heat exchange device according to claim 7, wherein:
the valve seat portion comprises a bottom section and a middle section, the bottom section comprises the bottom opening, the middle section comprises the peripheral opening, the valve seat matching portion comprises an annular wall portion, and the bottom section and the annular wall portion are sealedly arranged;
a side hole corresponding to the peripheral opening is defined in the valve seat matching portion, and the side hole is closer to the first side portion of the core body member than the annular wall portion along the stacking direction of the core body member.

9. The heat exchange device according to claim 1, wherein:
the connecting member comprises a drainage pipe;
the plate portion comprises a third plate and a fourth plate, the third plate is fixed to the fourth plate by welding, the third plate comprises a first annular protruding portion, the fourth plate comprises a second annular protruding portion, at least part of the valve seat portion inserts into the first annular protruding portion, the valve seat portion comprises a bottom section, the bottom section comprises the bottom opening, and the bottom section and the first annular protruding portion are sealedly arranged;
the first end portion of the connecting member inserts into the second annular protruding portion, and the second annular protruding portion is fixed to the connecting member by welding.

10. The heat exchange device according to claim 9, wherein:
the valve seat portion comprises the bottom section and a middle section, the bottom section comprises the bottom opening, the middle section comprises the peripheral opening, a side where the core body member is provided with the valve core member is defined as an upper side, and the middle section is located on the upper side of the connecting member;

at least part of the first end portion of the connecting member is fixed to the second annular protruding portion by welding, and the second end portion is fixed to the core body member by welding;

the first end portion comprises a first section and a second section, the first section of the first end portion inserts into the second annular protruding portion, the second section does not insert into the second annular protruding portion, an outer diameter of the second section is larger than an outer diameter of the first section, and the outer diameter of the second section is larger than an inner diameter of the second annular protruding portion.

11. The heat exchange device according to claim 2, wherein:

the connecting member comprises a flange portion, which protrudes along a radial direction of the connecting member;

the plate portion comprises a first plate and a second plate, the first plate is fixed to the second plate by welding, and a top or a bottom of the flange portion is fixed to the first plate by welding; or, the top or the bottom of the flange portion is fixed to the second plate by welding;

and/or, the core body member comprises a top pressing block, and the flange portion is fixed to the top pressing block by welding.

12. The heat exchange device according to claim 3, wherein:

the connecting member comprises a flange portion, which protrudes along a radial direction of the connecting member;

the plate portion comprises a first plate and a second plate, the first plate is fixed to the second plate by welding, and a top or a bottom of the flange portion is fixed to the first plate by welding; or, the top or the bottom of the flange portion is fixed to the second plate by welding;

and/or, the core body member comprises a top pressing block, and the flange portion is fixed to the top pressing block by welding.

13. The heat exchange device according to claim 4, wherein:

the connecting member comprises a flange portion, which protrudes along a radial direction of the connecting member;

the plate portion comprises a first plate and a second plate, the first plate is fixed to the second plate by welding, and a top or a bottom of the flange portion is fixed to the first plate by welding; or, the top or the bottom of the flange portion is fixed to the second plate by welding;

and/or, the core body member comprises a top pressing block, and the flange portion is fixed to the top pressing block by welding.

14. The heat exchange device according to claim 2, wherein:

the connecting member comprise a valve seat matching portion and a drainage pipe, the valve seat matching portion and the valve seat portion are sealedly arranged, the valve seat matching portion comprises a bottom end portion, the drainage pipe is fixed to the bottom end portion by welding, and part of the drainage pipe is located in the valve seat matching portion;

the drainage pipe comprises an external expansion portion, the valve seat matching portion is closer to the valve seat portion than the external expansion portion along a stacking direction of the core body member, and the external expansion portion cooperates with the bottom end portion of the valve seat matching portion for achieving limiting.

15. The heat exchange device according to claim 3, wherein:

the connecting member comprise a valve seat matching portion and a drainage pipe, the valve seat matching portion and the valve seat portion are sealedly arranged, the valve seat matching portion comprises a bottom end portion, the drainage pipe is fixed to the bottom end portion by welding, and part of the drainage pipe is located in the valve seat matching portion;

the drainage pipe comprises an external expansion portion, the valve seat matching portion is closer to the valve seat portion than the external expansion portion along a stacking direction of the core body member, and the external expansion portion cooperates with the bottom end portion of the valve seat matching portion for achieving limiting.

16. The heat exchange device according to claim 4, wherein:

the connecting member comprise a valve seat matching portion and a drainage pipe, the valve seat matching portion and the valve seat portion are sealedly arranged, the valve seat matching portion comprises a bottom end portion, the drainage pipe is fixed to the bottom end portion by welding, and part of the drainage pipe is located in the valve seat matching portion;

the drainage pipe comprises an external expansion portion, the valve seat matching portion is closer to the valve seat portion than the external expansion portion along a stacking direction of the core body member, and the external expansion portion cooperates with the bottom end portion of the valve seat matching portion for achieving limiting.

17. The heat exchange device according to claim 5, wherein:

the connecting member comprise a valve seat matching portion and a drainage pipe, the valve seat matching portion and the valve seat portion are sealedly arranged, the valve seat matching portion comprises a bottom end portion, the drainage pipe is fixed to the bottom end portion by welding, and part of the drainage pipe is located in the valve seat matching portion;

the drainage pipe comprises an external expansion portion, the valve seat matching portion is closer to the valve seat portion than the external expansion portion along a stacking direction of the core body member, and the external expansion portion cooperates with the bottom end portion of the valve seat matching portion for achieving limiting.

18. The heat exchange device according to claim 6, wherein:

the connecting member comprise a valve seat matching portion and a drainage pipe, the valve seat matching portion and the valve seat portion are sealedly arranged, the valve seat matching portion comprises a bottom end portion, the drainage pipe is fixed to the bottom end portion by welding, and part of the drainage pipe is located in the valve seat matching portion;

the drainage pipe comprises an external expansion portion, the valve seat matching portion is closer to the valve seat portion than the external expansion portion along a stacking direction of the core body member, and the external expansion portion cooperates with the bottom end portion of the valve seat matching portion for achieving limiting.

* * * * *